Sept. 14, 1954  A. W. CAPS  2,688,898
MOUNTING FOR PHOTOGRAPHIC LENS BOXES
Filed Aug. 18, 1951  2 Sheets-Sheet 2
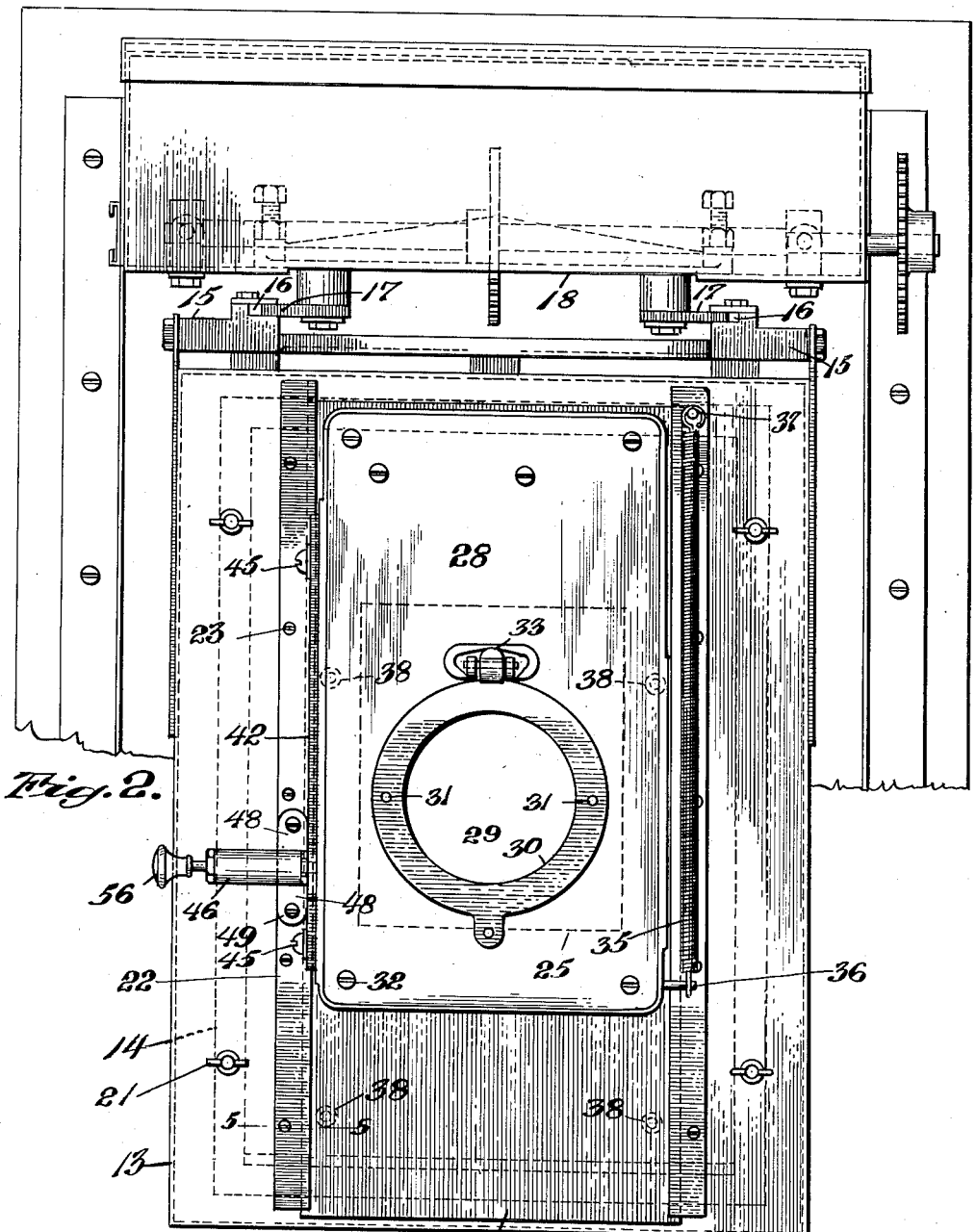
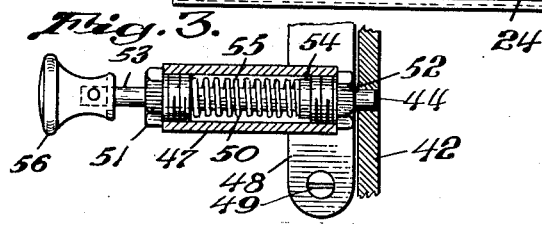
INVENTOR.
Arthur W. Caps
BY
Barlow & Barlow
ATTORNEYS.

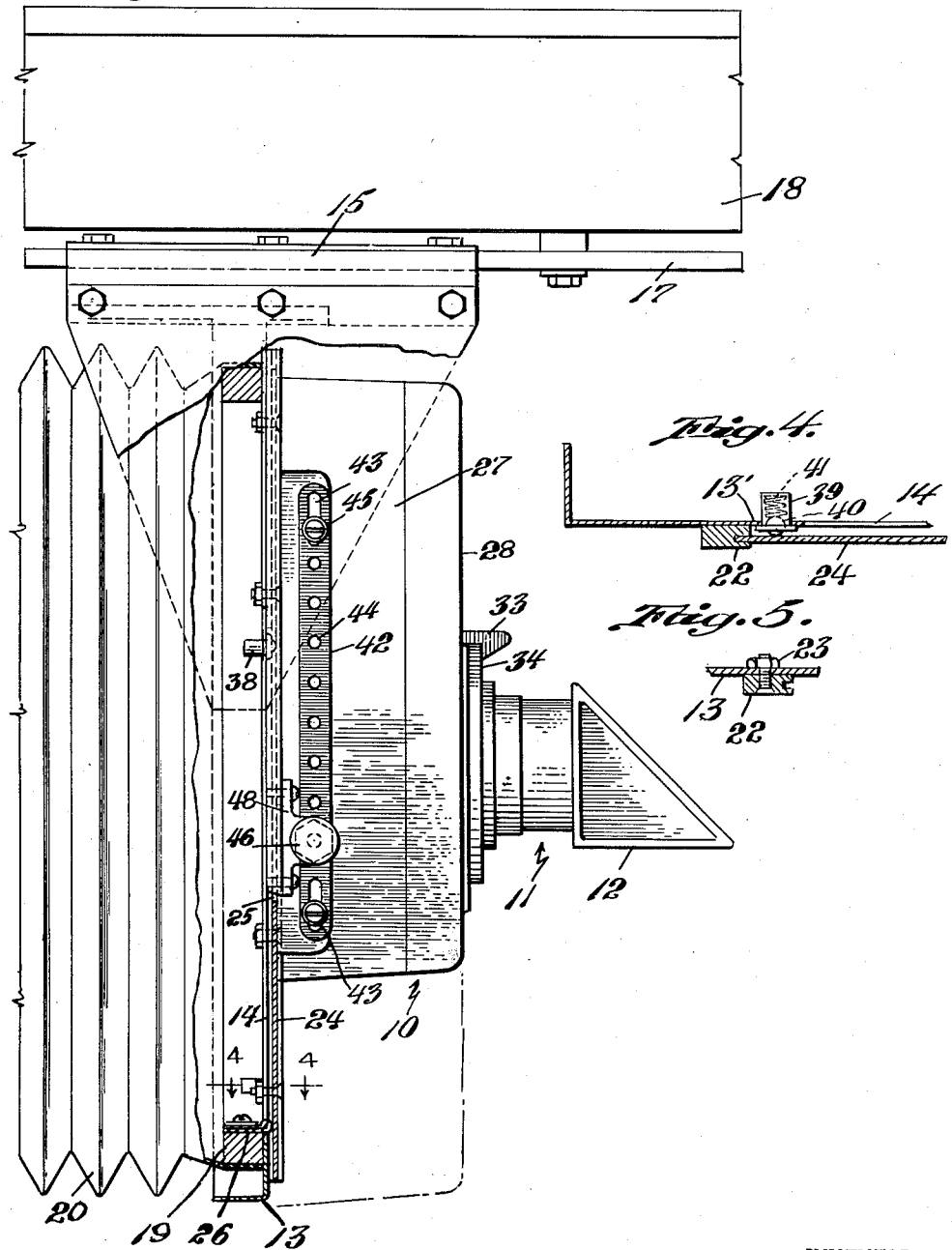

Patented Sept. 14, 1954

2,688,898

UNITED STATES PATENT OFFICE 2,688,898

MOUNTING FOR PHOTOGRAPHIC LENS BOXES

Arthur W. Caps, Rochester, N. Y., assignor to Photostat Corporation, a corporation of Rhode Island Application August 18, 1951, Serial No. 242,454

3 Claims. (Cl. 88—24)

This invention relates to a photographic camera, particularly to the mounting of the lens box thereof.

Commercial cameras for making photographic copies of letters, documents, and the like have a focal plane support, across which a photographic film or paper is drawn from a roll supply to be in position in the focal plane at which the images to be reproduced are formed. The exposed portion of the paper is drawn from the focal plane, severed, and then carried through the various baths for treating the same. At different times it is desired to make photographic reproductions upon different areas of the focal plane and to redraw only such amount of paper as was exposed in this area of the focal plane. For example, when making a large size reproduction within the capacity of the camera, the entire area of the focal plane may be exposed. When a small reproduction is made, only a portion of the focal plane may be exposed, the rest being left unexposed as by placing an opaque screen in front of the part which is not to be exposed. In order to center the lens of the camera with regard to the area of the focal plane to be exposed, the lens support is usually slidably mounted and is moved by a rack and pinion arrangement to center the lens with regard to this area of focal plane to be exposed, there being a scale and pointer provided to indicate the adjustment made of the position of the lens.

An object of this invention is to provide in a camera of the above character, a more simple mounting for the lens box which will permit manually moving the lens box and locking the same at predetermined positions to definitely center the lens with regard to the desired focal plane area to be exposed.

Another object of this invention is to provide for locking the lens box in the desired position by a simple lock pin and hole arrangement.

Another object of this invention is to provide a resilient slidable mounting for the lens box arranged to prevent vibration between the lens box and support therefor.

With these and other objects in view, the invention consists of certain novel features of construction, as will be more fully described and particularly pointed out in the appended claims.

In the accompanying drawings:

Fig. 1 is a side elevational view of a fragmental portion of a camera embodying my invention;

Fig. 2 is a front plan view of the portion of the camera shown in Fig. 1;

Fig. 3 is a sectional view of a locking pin arrangement for securing the lens box in adjusted position;

Fig. 4 is a sectional view taken substantially along line 4—4 of Fig. 1 and showing the arrangement for resiliently mounting the slide of the lens box; and Fig. 5 is a sectional view taken substantially along line 5—5 of Fig. 2.

Referring to the drawings for a more detailed description of the invention, 10 designates generally a lens support or box in which is housed the shutters (not shown) of the camera. A lens mounting 11 having a prism 12 is detachably mounted on the front of the lens box 10 and provides the lens system of the camera for bending the light rays to be projected on the focal plane (not shown) of the camera.

A front frame or casing 13 having a front rectangular opening 14 therethrough is rigidly supported on a cast frame 15 which has grooves 16 in which is received tracks 17 which are supported on an over arm 18. The bellows frame 19, to which is attached one end of the bellows 20 of the camera, is fastened to the frame 13 by means of wing nuts 21 (see Fig. 2). The front frame 13 and that which is attached thereto are slidable along the said tracks 17 for focusing adjustments. Guides 22 are secured to the front of the casing 13 in position adjacent the opposite vertical edges of the openings 14 as by means of bolt and nut fastenings 23.

A plate or slide 24 having a rectangular opening 25 therethrough is slidably received in the guides 22 with the opening 25 in register with the opening 14 at all different positions of said plate relative to said casing. A light seal 26 (see Fig. 1) is fastened to the lower crossbar of the frame 19 and extends therefrom into engagement with the adjacent side of the plate 24 along the lower edge of the said opening 14. The lens box has a body portion 27 which is open at the front and rear thereof and is secured to the plate 24 to move therewith. A closure 28 is secured to the body 27 as by means of screw fastenings 32 and has a front annular opening 29 (see Fig. 2) which is surrounded by a lens mounting boss 30 having pins 31 projecting outwardly therefrom. The lens mounting 11 is provided with matched openings (not shown) to receive the pins 31 and is secured to the boss by means of a spring-pressed hook 33 which engages the flange 34 on the mounting 11 and detachably secures the said mounting 11 in position on the lens box 10. A pull spring 35 (see Fig. 2) has one end thereof secured to a pin 36 which projects from the lower end portion of the body 27 and its other end is similarly attached to a pin 37 extending from the adjacent guide 22; thus, the lens box 10 is spring urged upwardly in a vertical direction, as seen in the drawings, and may be manually moved downwardly against the action of said spring.

In order to prevent vibration of the lens box and still provide for a smooth sliding movement of the lens box, a plurality of spring buttons 38 are positioned to bear against the plate 24 to resiliently hold the same in engagement with the walls of the guides 22. These buttons, one of which is shown in detail in Fig. 4, comprise a cup 39 in which a captive ball 40 is urged to move outwardly by a compression spring 41. The button is frictionally received in a suitable opening in the marginal edge 13' about the opening 14, the ball 40 being at a position to engage the plate 24 to urge the same against the wall of the guide 22. There are four of these buttons 38 and these are positioned to engage opposite sides of the plate 24 adjacent the said guides 22.

As previously pointed out, the lens box may be manually moved up and down to center the lens system of the camera with the desired area of focal plane to be exposed. In order to provide for a plurality of definite predetermined lens locating positions, I mount on one side of the lens box a bar 42 which is provided at each end with elongated openings 43 and a plurality of spaced openings 44 therethrough. This bar 42 is adjustably secured on the lens box by means of screws 45 passing through the said openings 43 and threadingly engaging the lens box body 27. The openings 44 are spaced a predetermined distance from each other and are located at predetermined distances with regard to the focal center of the lens of the camera. A spring-pressed lock pin or plunger 46 comprising a body 47 having foot portions 48 is attached to the lens box support as by means of screws 49 at a position adjacent to the said bar 42, this lock pin or plunger 46 providing a datum line with reference to the center of the focal plane of the camera. The body 47 is provided with a bore 50 (Fig. 3), the end portions of which are threaded to receive plugs 51, 52, which are bored to slidably receive a pin 53. The end portions of the pin 53 extend beyond the body while within the bore there is a collar 54 pinned thereto to engage against the inner side of the plug 52. A compression spring 55 surrounds the portion of the pin 53 within the bore and acts between the plug 51 and collar 54 to move the pin 53 toward said bar 42 and into such openings 44 which may be in register therewith. A handle 56 may be attached to the pin 53 for convenience in withdrawing said pin from engagement with an opening 44. It will be understood that the pin is positioned in a plane to move into any of the said openings 44 when in register therewith.

Each opening 44 is spaced from each other with regard to the focal center of the lens, so as to provide for locking the lens box at a definite predetermined position so as to center the lens relative to a definite desired area of the focal plane of the camera. The number of openings 44 may be chosen to suit a particular type of camera. In the present disclosure, by way of example, eight positions or openings 44 are shown, the distance between each opening representing one-eighth of the area of the said focal plane. Thus, in Fig. 1 the lens box is shown locked in position with the lowermost of the openings 44 to provide for centering the lens to make the largest production within the capacity of the camera. Moving the lens box to register the next opening 44 with the plunger 46 will provide for locking the lens box in position to center the lens on seven-eighths of the area of the said focal plane. Likewise, moving the lens box to register the next higher opening 44 with the plunger will provide for locking the lens box in position to center the lens on three-fourths of the area of the said focal plane and the images to be reproduced will be formed on this three-fourths of the area of the focal plane. In a like manner, moving the lens to register with other holes 44 with the plunger 46 will provide for locking the lens box in positions to center the lens of the camera on the various areas of the focal plane of the camera predetermined by the position of these openings 44 relative to the focal center of the lens.

It will be apparent from the above that I have disclosed a simple but practical arrangement operable to readily provide definite positions of lens box to center the lens on predetermined areas of the focal plane of the camera.

I claim:

1. In a camera, a vertically extending support, a lens mounting, a lens box for supporting said lens mounting slidably mounted on said support for manual movement of said lens box for changing the focal centering of said lens with respect to the center of the focal plane of the camera, resilient means tending to move said box upwardly on said support, a spring pressed lock pin carried by said support and providing a datum point with respect to the focal center of the said focal plane, a bar carried by said lens box and having a plurality of spaced openings therethrough at predetermined positions with respect to the focal center of said lens and movable into register with said lock pin to be received therein for locking said lens box in any one of said predetermined positions, said bar having elongated slots in the end portions thereof for adjustably securing the same in position.

2. In a camera as set forth in claim 1 wherein said resilient means tending to move said box upwardly on said support is a pull spring.

3. In a camera, a vertically extending support having spaced guides each provided with a longitudinal groove therein, a lens mounting, a lens box for supporting said lens mounting having a back plate with opposite edges thereof slidably received in said grooves for movement along said guides for manual movement of said lens box for changing the focal centering of said lens with respect to the center of the focal plane of the camera, resilient means for resiliently holding said opposite edges against the walls of said grooves, resilient means tending to move said box upwardly on said support, a spring pressed lock pin carried by said support and providing a datum point with respect to the focal center of the said focal plane, a bar carried by said lens box and having a plurality of spaced openings therethrough at predetermined positions with respect to the focal center of said lens and movable into register with said lock pin to be received therein for locking said lens box in any one of said predetermined positions, said bar having elongated slots in the end portions thereof for adjustably securing the same in position.

References Cited in the file of this patent

UNITED STATES PATENTS

| Number | Name | Date |
|---|---|---|
| 1,800,007 | Caps | Apr. 7, 1931 |
| 2,043,970 | Luz | June 9, 1936 |
| 2,359,429 | Langdon | Oct. 3, 1944 |
| 2,377,954 | Mellien | June 12, 1945 |